P. WHITE.
Machines for Mixing Mortar.
No. 155,212.                      Patented Sept. 22, 1874.
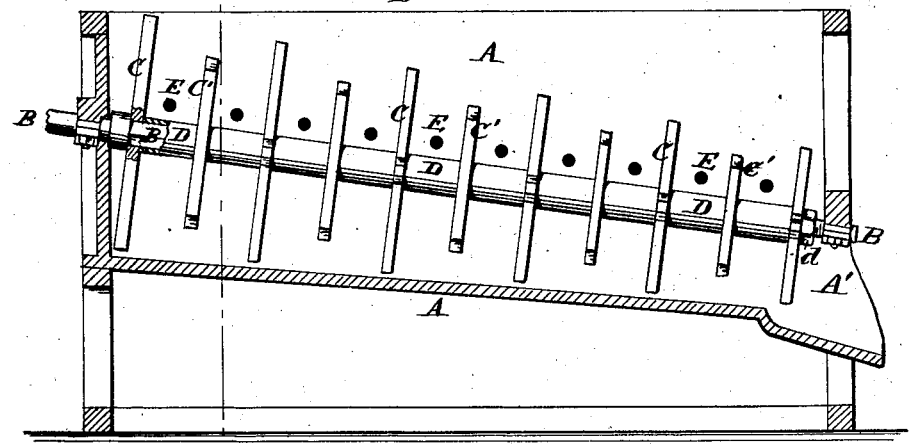
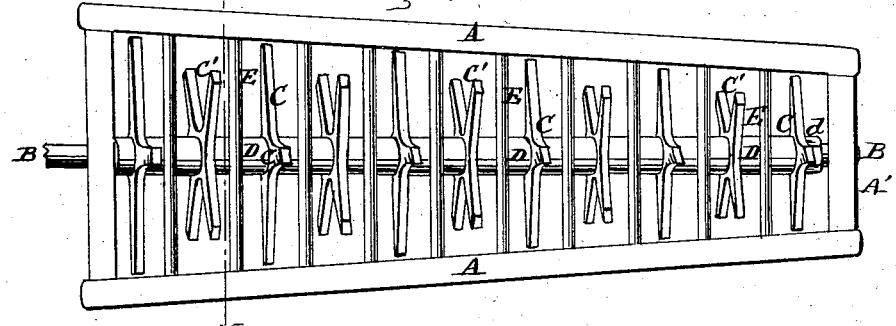
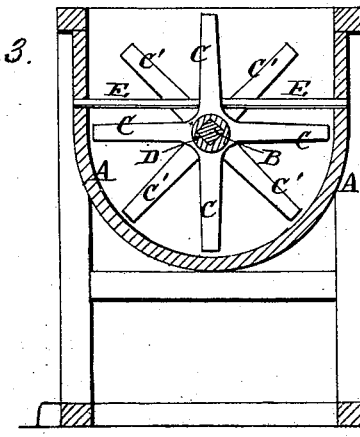
Witnesses:
J. W. Kennedy
William Steinhoff
Inventor:
Porter White

UNITED STATES PATENT OFFICE.

PORTER WHITE, OF ST. LOUIS, MISSOURI.

IMPROVEMENT IN MACHINES FOR MIXING MORTAR.

Specification forming part of Letters Patent No. 155,212, dated September 22, 1874; application filed June 10, 1874.

*To all whom it may concern:*

Be it known that I, PORTER WHITE, of St. Louis, St. Louis county, Missouri, have invented a certain Improved Machine for Mixing Mortar, of which the following is a specification:

This invention consists in the provision, in an open-topped horizontal trough, of a shaft, on which is secured a series of radial blades, which, when revolving, pass between a series of fixed transverse bars or rods secured in the trough, the transverse bars supporting the hair, &c., and materially assists in a thorough and intimate mixture of the component parts of the mortar. The trough is preferably constructed so as to taper to the point of discharge, the series of wings or arms being similarly tapered, and the wings may be arranged inclined across the axis of their shaft, said incline or pitch of the wings or blades gradually decreasing from the point of discharge.

In the drawing, Figure 1 is a sectional elevation. Fig. 2 is a plan. Fig. 3 is a transverse section at line $x\ x$.

A is a mixing-trough, tapering to the discharge-opening A'. B is a shaft, centrally arranged in said trough, and provided with a series of blades, C C'. The blades C are cast in sections, and each alternate section C' is preferably arranged to fit within the space of the adjoining blades, as clearly shown in Fig. 3, so that each alternate section of the blades will strike the mortar at a time. The blades may be secured in any suitable manner on the shaft B. In the drawings I have shown the shafts square, with distance-collars D between each section, and a nut, $d$, to keep the whole series in position. E is a series of fixed transverse bars or rods, arranged between the blade-sections C C. The series of blades C C' may be inclined or pitched from the axis of the shaft B, if required, so as to assist in feeding the mortar to the discharge-opening A, said pitch or inclination of the blades being graduated so that the blades near the discharge-opening will have a quick pitch, and those at the back of the trough little or no pitch, as shown in Fig. 2.

The operation is as follows: The sand, lime, and other component parts of the mortar are placed at the back end of the trough A, and, as it flows forward in the trough, it is thoroughly and intimately mixed by the blades C C and transverse bars E before it reaches the discharge-opening A.

It is evident that the mortar can be tempered with more sand, lime, or hair, as required, by introducing them at any point along the trough.

I claim as my invention—

1. The combination, with the trough having the longitudinal opening throughout the whole length and end discharge A', of the mixing-blades C and fixed bars E, substantially as and for the purpose set forth.

2. The tapering inclined trough A, having the longitudinal opening throughout its whole length, and fixed transverse bars E, in combination with the series of rotary blades C C', distance-collars D, and nut $d$, as and for the purpose set forth.

PORTER WHITE.

Witnesses:
I. W. KENNEDY,
WILLIAM STEINHOFF.